United States Patent [19]

Welschof

[11] Patent Number: 5,026,325
[45] Date of Patent: Jun. 25, 1991

[54] CONSTANT VELOCITY RATIO PLUNGING UNIVERSAL JOINT

[75] Inventor: Hans-Heinrich Welschof, Rodenbach, Fed. Rep. of Germany

[73] Assignee: Löhr & Bromkamp GmbH, Offenbach am Main, Fed. Rep. of Germany

[21] Appl. No.: 324,397

[22] Filed: Mar. 16, 1989

[30] Foreign Application Priority Data

Mar. 17, 1988 [DE] Fed. Rep. of Germany ....... 3808947
Mar. 17, 1988 [DE] Fed. Rep. of Germany ....... 3808948

[51] Int. Cl.$^5$ ............................................. F16D 3/227
[52] U.S. Cl. .................................. 464/146; 464/144; 464/906
[58] Field of Search .................. 464/144, 145, 146, 906

[56] References Cited

U.S. PATENT DOCUMENTS

| | | | |
|---|---|---|---|
| 3,237,429 | 3/1966 | Henry-Biabaud | 464/146 X |
| 3,367,139 | 2/1968 | Ristau | 464/144 |
| 3,488,979 | 1/1970 | Croset | 464/906 X |
| 3,553,979 | 1/1971 | Noguchi et al. | 464/145 |
| 4,012,925 | 3/1977 | Krude | 464/146 |
| 4,464,143 | 8/1984 | Bowyer | 464/146 |
| 4,511,346 | 4/1985 | Hazebrook et al. | 464/146 |
| 4,678,453 | 7/1987 | Aucktor et al. | 464/146 X |

FOREIGN PATENT DOCUMENTS 1251595 4/1968 Fed. Rep. of Germany .

*Primary Examiner*—Daniel P. Stodola
*Attorney, Agent, or Firm*—Toren, McGeady & Associates

[57] ABSTRACT

A constant velocity ratio plunging universal joint, comprising an outer joint member (101, 201, 301), an inner joint member (102, 202, 302), torque-transmitting balls (103, 203, 303) engaging in straight axis-parallel tracks in the joint members, and a cage (104, 204, 304) holding the balls with their centers in a common plane. There are further provided control members either in the form of radially disposed pins (105, 106, 305, 306) or smaller balls (221, 225) engaging further tracks in the joint members to control the axial position of the cage relative thereto. The further tracks engaged by the control members are not parallel to the axes of the joint members, either crossing one another in developed view of the joint or diverging from one another in longitudinal section of the joint.

15 Claims, 6 Drawing Sheets

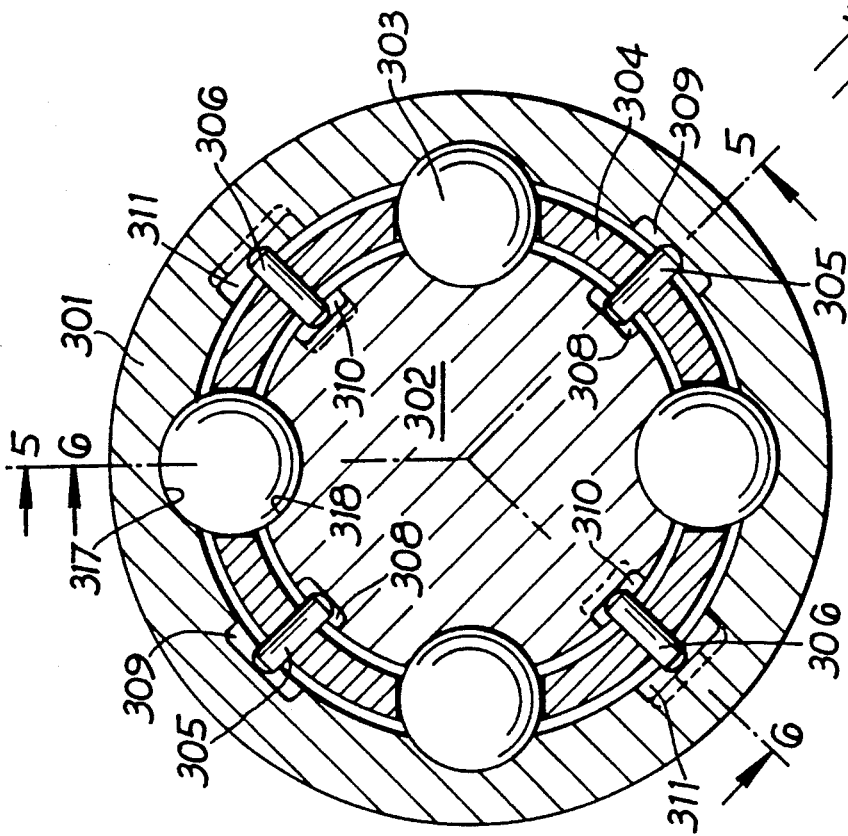
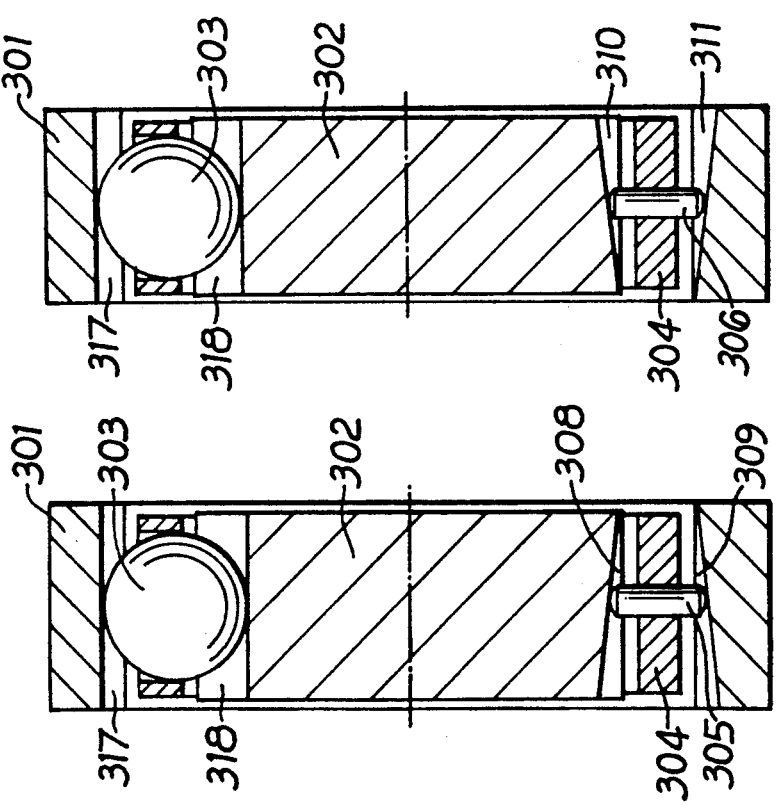

CONSTANT VELOCITY RATIO PLUNGING UNIVERSAL JOINT

BACKGROUND TO THE INVENTION

1. Field of the Invention

This invention relates to a constant velocity ratio plunging universal joint, comprising an inner joint member, an outer joint member, a plurality of balls engaging in facing pairs of tracks disposed circumferentially about the joint members for torque transmission therebetween, said tracks in each joint member having centre lines extending parallel to the axis of rotation of the joint member, and a cage of annular form between the joint members and holding the balls so that their centres lie in one plane. Such a joint will hereafter be referred to as a joint of the kind specified.

2. Description of Prior Art

In one well known embodiment of joint of the kind specified, the cage has a part-spherical internal surface and a part-spherical external surface, the centres of curvature of such surfaces being offset by equal distances on opposite sides of the plane in which the centres of the balls are held. The part-spherical external surface of the cage engages an internal cylindrical surface of the outer joint member between the tracks thereof, while the part-spherical internal surface of the cage engages a part-spherical surface provided on a sleeve which is slidable axially on a cylindrical surface of the inner joint member between the tracks thereof. Such a cage configuration has the effect of guiding the plane containing the centres of the balls so as to bisect the angle between the rotational axes of the inner and outer joint members when the joint is articulated, thereby ensuring that the joint has constant velocity ratio (homokinetic) running properties. The arrangement of the sleeve axially slidable on the inner joint member means that the cage is able to move axially relative to both joint members, thereby facilitating the plunging of the joint with minimal frictional resistance thereto.

It would be desirable if, when the joint plunges (i.e. the joint members move axially relative to one another), the cage moves by an equal distance relative to each of the joint members and when the joint members are in a position in the middle of their range of plunging movement relative to one another, the cage is centered in its range of movement relative to each joint member. In practice, however, depending on the frictional conditions between the cage and the two joint members, the cage will assume a position at the end of its range of movement relative to one or other of the joint members, even when the joint members themselves are in their central relative position. In consequence, when the joint plunges out of such position in one of the two possible directions, the cage will not be able to move further relative to one of the joint members, and the torque-transmitting balls will not be able to roll freely along the tracks in such joint member. Consequently there will be an undesirable high sliding frictional resistance to such plunge.

Plunging constant velocity ratio universal joints are also known from DE-PS-1251595, wherein the torque-transmitting balls engage in tracks whose centre lines lie in planes containing the rotational axes of the respective joint members. The centre lines are not parallel to such axes, however, and the tracks of each facing pair diverge from one another. Around the joint, the facing pairs of tracks diverge from one another alternately in opposite directions axially of the joint. This joint, however, has a disadvantage in that because of the necessary circumferential distance between the balls, the depth of part of the tracks receiving the balls decreases considerably in one axial direction, limiting the torque transmitting capacity of the joint. Further, the track shapes are difficult to produce.

SUMMARY OF THE INVENTION

It is the object of the present invention to provide a constant velocity ratio plunging universal joint wherein the above described disadvantages are overcome. Thus, the torque transmitting ability of the joint should not be impaired, whilst the cage is guided to be centered axially relative to the inner and outer members of the joint.

According to the present invention, we provide a plunging constant velocity ratio universal joint of the kind specified wherein the joint members are provided with at least one facing pair of further tracks receiving a control member engaging the cage, said pair of further tracks having centre lines which are not parallel to the respective axes of rotation of the joint members and are so configured that when the joint plunges the cage is caused to undergo an axial movement relative to each joint member of half the total plunging distance of the joint.

A joint according to the invention has the advantage that even if most of the space available in the joint members is utilised by the tracks for the torque-transmitting balls, it will still usually be possible to accommodate the further tracks for the control member or members, which, as will be apparent from the following description, need not be as large as those for the torque transmitting balls. At the same time, the required cage guidance is achieved.

The control member or members provided in a joint according to the invention may guide the cage only in respect of the axial position thereof relative to the joint members, but not guide the attitude of the cage in such a way that the plane of the centres of the torque-transmitting balls is caused to bisect the angle of articulation of the joint. Such guidance of the cage into the bisector plane may be achieved in known manner by providing the cage with external and internal part-spherical surfaces whose centres of curvature are equally offset to opposite sides of the plane of the centres of the torque-transmitting balls, such surfaces of the cage engaging, respectively, an internal cylindrical surface of the outer joint member between the tracks thereof and a part-spherical surface provided on a sleeve slidable on a cylindrical surface of the inner joint member between the tracks thereof.

Because the control members are not required to guide the cage into the bisector plane, it is not necessary to provide control members disposed about the joint in two mutually perpendicular planes.

In one embodiment of the invention, there are provided at least two control members engaging a corresponding number of facing pairs of further tracks in the joint members, the centre line of each further track lying in a plane which also contains the axis of rotation of its joint member, but the centre line being inclined to said axis so that the centre lines of the tracks of each facing pair thereof intersect one another, the centre lines of one facing pair of further tracks and the next circumferentially adjacent pair thereof in the joint members intersecting one another on opposite axial sides of the joint. As each facing pair of tracks is viewed in longitudinal section of the joint, they diverge from one another, and circumferentially adjacent pairs of tracks diverge from one another in opposite directions. If there are two pairs of further tracks and two control members, one of such control members is effective to move the cage in one direction of relative plunging movement of the joint members while the other control member is effective to move the cage in the opposite direction of relative plunging movement between the joint members.

For reasons of symmetry and balancing in the joint, such two facing pairs of further tracks may be disposed diametrically opposite one another in the joint.

A particular advantage of this configuration of the further tracks is that, as their centre lines lie in planes which also contain the axes of rotation of the joint members, as the joint members are viewed in a circumferentially developed view the further tracks are positioned parallel to the tracks for the torque transmitting balls, and therefore require little space.

With such a configuration of the further tracks, in a particularly advantageous embodiment described hereafter the control members comprise cylindrical members disposed generally radially in the joint, which members may have hemispherical ends engaging the further tracks. Such control members occupy a relatively small dimension circumferentially of the joint, and the further tracks in which they engage do not have to be of increasing width as their depth increases as the centre lines diverge from one another. Consequently, a high percentage of the circumference of the joint is available for the torque transmitting balls, even if there should be provided four control members (which would be equally spaced circumferentially about the joint). However, it would alternatively be possible for the control members to comprise balls, which preferably are relatively small compared with the torque-transmitting balls.

In another advantageous embodiment, the centre lines of the further tracks in the joint members may be inclined to the planes containing the rotational axes of the joint members, the tracks in each pair being oppositely inclined at equal angles so that, in developed view of the joint, the tracks of each pair cross one another. In other words, the projections of the centre lines on the common axis of rotation of the joint members in an aligned (non-articulated) joint intersect such common axis at equal and opposite angles.

This arrangement of tracks is known per se for receiving the torque-transmitting balls in plunging universal joints of the so-called "cross groove" type, wherein the arrangement of tracks guides the torque-transmitting balls so that the plane of their centres bisects the angle between the rotational axes of the joint members. In this embodiment of joint according to the invention, the crossed further tracks guide the cage to centre it and so that it moves equally relative to the joint members when the joint plunges. A single pair of further tracks of such configuration would be sufficient to guide the cage; however, it is advantageous if two diametrically opposed such pairs of further tracks are provided. Where there are two diametrically opposed pairs of further tracks, which may receive control members in the form of balls of smaller diameter than the torque-transmitting balls, the further tracks in each joint member, in developed view of the joint member, may extend parallel to each other, which is advantageous from the point of view of production thereof.

In a further embodiment of joint according to the invention, the control members may guide the cage both in respect of its axial position relative to the joint members, and in respect of its attitude relative to the joint members so that the plane of the centres of the torque-transmitting balls bisects the angle between the rotational axes of the joint members when the joint is articulated. In this embodiment, the joint is provided with four control members engaging four facing pairs of further tracks, the centre lines of the tracks in each further track pair intersecting one another, the centre lines of circumferentially adjacent facing pairs intersecting one another on opposite axial sides of the joint. Because the centre lines of the further tracks lie in planes containing the axes of rotation of the respective joint members, they occupy little circumferential space in the joint. The torque-transmitting balls, engaging tracks with axis-parallel centre lines, can take up the majority of the available circumferential space in the joint, giving the joint a high torque capacity.

In order that the further tracks for the control members do not impinge too greatly on the space available for the tracks of the torque-transmitting balls, the control members may be disposed on a pitch circle of smaller or larger diameter than the pitch circle of the centres of the torque-transmitting balls.

As above referred to, it is advantageous if the control members comprise radially oriented cylindrical members having hemispherical ends, which enables the width of the further tracks to be kept to a minimum. Where the control members guide the cage both in respect of its axial position and attitude, the minimum of four control members is due to the fact that it is necessary firstly for there to be two control members engaging facing pairs of further tracks with centre lines which intersect one another to opposite sides axially of the joint so that together they act to guide the cage in both directions of plunging movement of the joint. If, however, such control members should happen to be in a plane which is perpendicular to the plane of joint articulation (the plane of joint articulation being the plane containing the axes of rotation of the two joint members) they cannot exert any forces on the cage to control the attitude thereof. Therefore there have to be provided two further control members in a further plane through the joint axis, which preferably is the plane of joint articulation, perpendicular to the first said plane.

The control members preferably occupy apertures in the cage in a substantially clearance-free manner, whilst the torque transmitting balls, which are subject to much higher forces than the control members, may occupy cage apertures with some free play in the circumferential direction of the cage. When the control members comprise radially oriented cylindrical pins, they should not be able to tilt relative to the cage.

In principle it is possible for the further tracks engaged by the control members to be of curved configuration, i.e. for their centre lines to be curved. However, it is preferred if the centre lines of the further tracks are straight. The bases of the further tracks may be in the form of part-conical surfaces, or may be planar and inclined to the axis of the joint member in which they are provided.

It is advantageous if there is an even number of torque-transmitting balls in the joint, so that two such balls are always diametrically opposed to one another across the joint. This substantially reduces frictional resistance to plunging of the joint.

Even when the joint is articulated, the control members do not transmit any torque. Because the cage is controlled axially of the joint, always to be centered relative to the joint members and to move relative to each by half the total plunging distance of the joint, the joint is readily able to plunge in either direction.

BRIEF DESCRIPTION OF DRAWINGS

The invention will now be described by way of example with reference to the accompanying drawings, of which:

FIGS. 5 and 6 are different transverse sections through a further embodiment of joint according to the invention, on the lines 5—5 and 6—6 of FIG. 7, respectively;

FIG. 7 is a transverse section through the joint of FIGS. 5 and 6;

FIG. 7A is a detail view of a part of FIG. 7 showing an alternative form of track cross-section for the control members.

DESCRIPTION OF PREFERRED EMBODIMENTS

Figure 1:
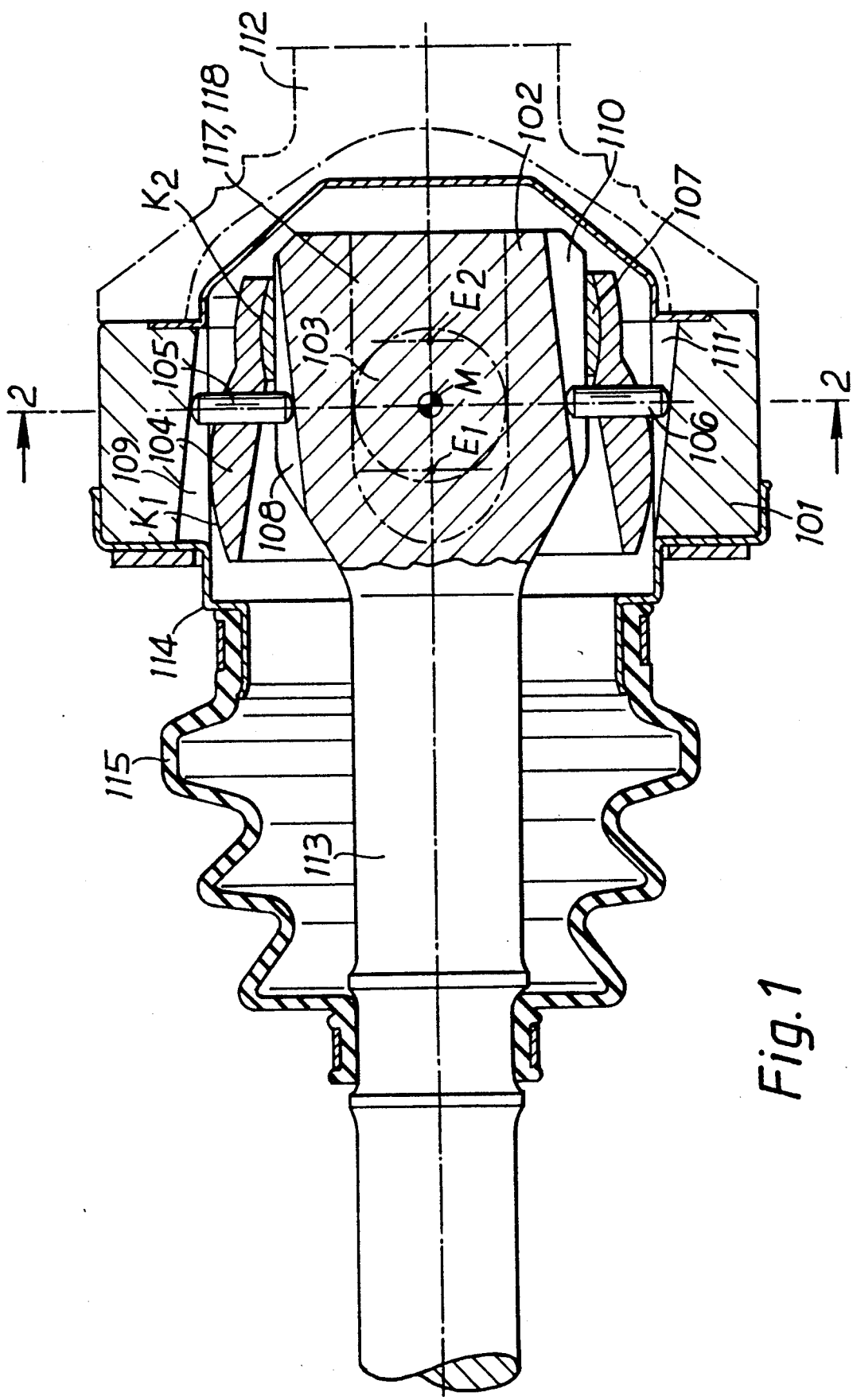
FIG. 1 is a longitudinal section through a first embodiment of joint according to the invention, on the line 1—1 of FIG. 2.
Figure 2:
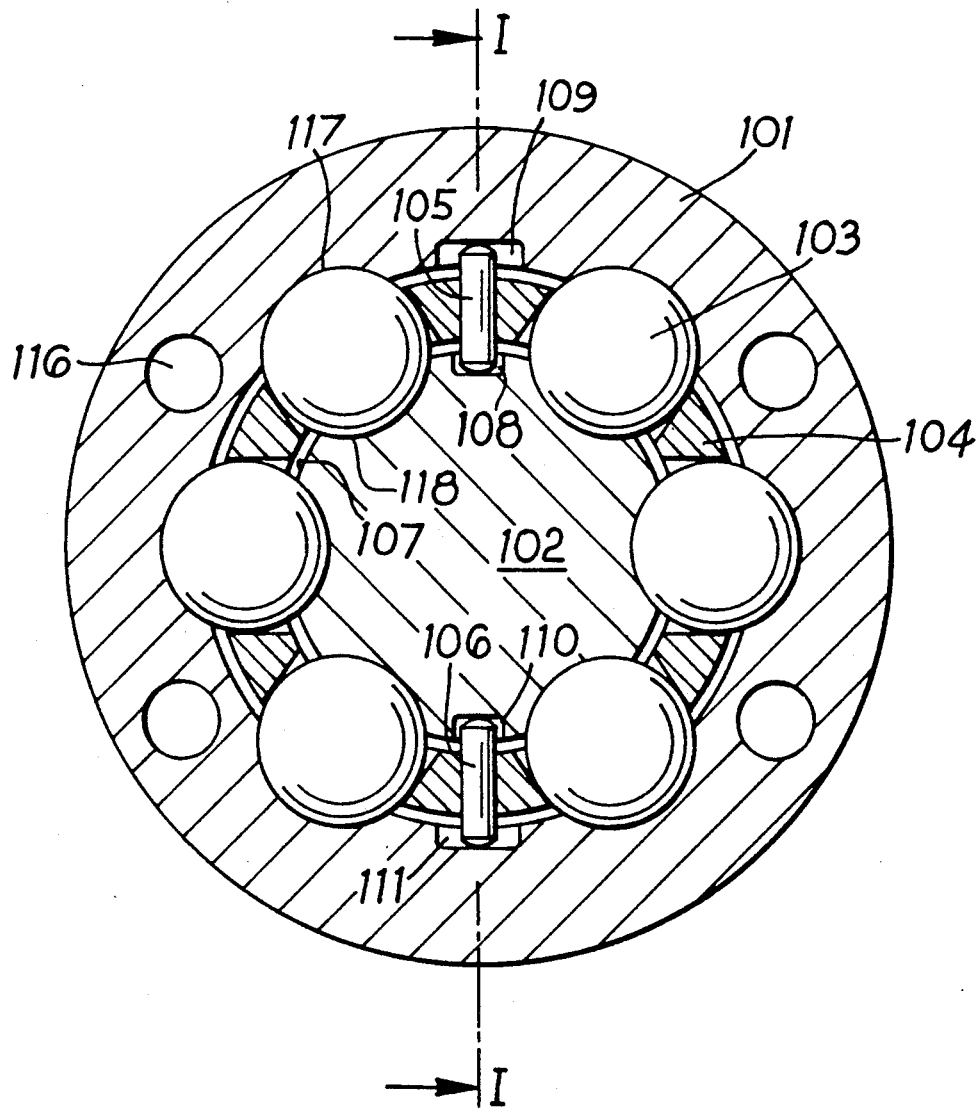
FIG. 2 is a transverse section through the joint of FIG. 1, on the line 2—2 thereof.

Referring firstly to FIGS. 1 and 2 of the drawings, there is shown a plunging type of constant velocity ratio universal joint whose main components are an outer joint member 101, an inner joint member 102, a cage 104, a plurality of torque-transmitting balls 103, and two control members 105, 106. A bell 112 for connection to a stub shaft element is connected to the outer joint member 101, while the inner joint member 102 is integral with a shaft portion 113. A sheet metal cap 114 on the outer joint member, and a flexible sealing boot 115 connected between the cap and the shaft portion 113, are provided for sealing the joint. Visible in FIG. 2 are holes 116 extending axially through the outer joint member 101, to receive fixing bolts (not shown) for connecting the bell and the cap to the joint member.

The torque-transmitting balls 103, disposed circumferentially about the joint, are engaged in respective facing pairs of tracks 117, 118 in the outer and inner joint members respectively. The tracks 117, 118 have centre lines which extend parallel to the rotational axes of the joint members wherein the tracks are provided, the tracks in each joint member being of uniform cross-sectional shape and depth. The cage 104 is an annular component with an external part-spherical surface K1 which contacts an internal cylindrical surface of the outer joint member 101 between the tracks 117 therein, so that the cage can slide axially relative to the outer joint member. The cage further comprises an internal part-spherical surface K2 which engages a complementary part-spherical surface provided on the outside of a sleeve 107, which is slidable axially of the inner joint member on a cylindrical surface thereof between the tracks 118 therein. The external and internal part-spherical surfaces K1, K2 of the cage have centres of curvature E1, E2 respectively which are offset axially by equal distances on opposite sides of a plane in which the cage holds the centres of the torque-transmitting balls 103. In FIG. 1, the point of intersection of such plane with the aligned rotational axes of the joint members is indicated at M. The cage configuration is effective, in well known manner, to guide the balls so that their centre plane bisects the angle between the axes of rotation of the inner and outer joint members when the joint is articulated.

The control members 105, 106 are disposed diametrically opposite one another in the cage 104. Each of the control members is in the form of a generally cylindrical pin or peg, having hemispherical ends, and is a close fit in an aperture extending radially through the cage so that the control member cannot tilt in such aperture. The control member 105 engages in a facing pair of further tracks 108, 109 provided in the inner and outer joint members respectively, whilst the control member 106 engages in a facing pair of further tracks 110, 111 in the inner and outer joint members. Each of the further tracks 108, 109, 110, 111 has a centre line which lies in a plane containing the rotational axis of the respective joint member, but is not parallel to such rotational axis. The centre lines of the facing pair of further tracks 108, 109 are equally and oppositely inclined to the axes of their joint members so as to diverge from one another to the left of the joint with reference to FIG. 1, whilst the tracks 110, 111 are so inclined as to diverge from one another towards the right hand side of the joint. The centre lines of the tracks 108, 109 thus intersect one another to the right hand side of the joint as illustrated, whilst the centre lines of the tracks 110, 111 intersect one another on the left hand side of the joint as illustrated. The further tracks 108, 109, 110, 111 have flat bases, engaged by the hemispherical ends of the control members 105, 106.

From a consideration of FIG. 1, it will be appreciated that when the joint plunges, i.e. the inner and outer joint members move axially relative to one another, the cage is guided so as always to remain centered relative to the two joint members, i.e. to move relative to each of the joint members by a distance equal to half the total plunging distance by which the joint members have moved relative to one another. Thereby the above described advantages of the invention are achieved. Such axial guidance of the cage is a function separate from the above described guidance of the ball centre plane when the joint is articulated, by virtue of the internal and external part-spherical surfaces of the cage.

Figure 2C:
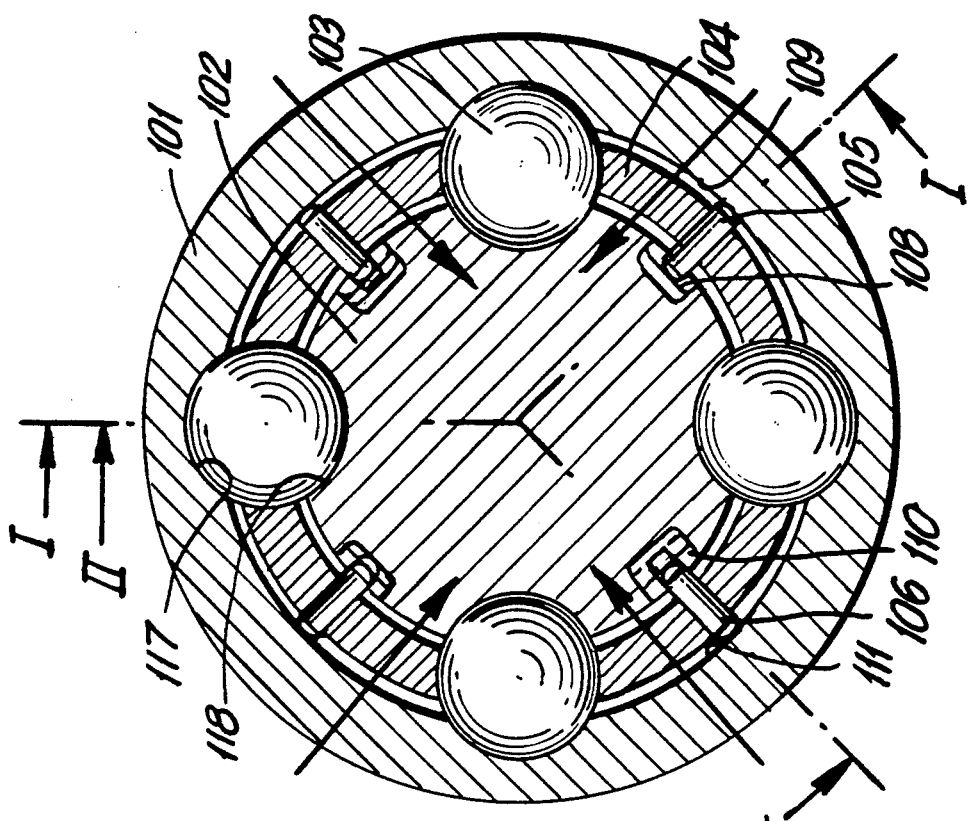
FIGS. 2a, 2b and 2c are sectional views with FIGS. 2a and 2b taken on sectional lines I—I and II—II respectively in FIG. 2c and illustrating another embodiment of FIG. 2.
Figure 2B:
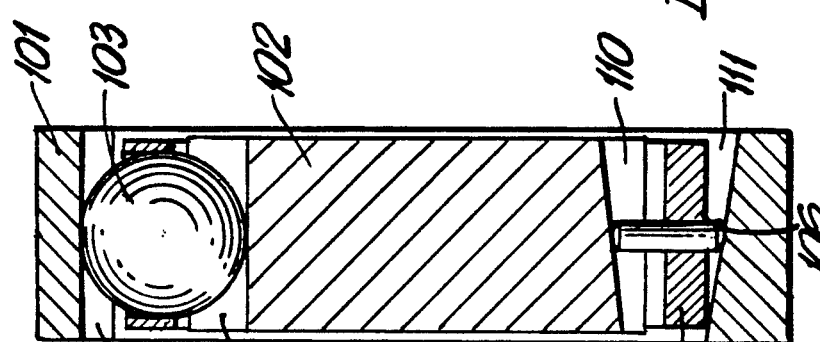
Figure 2A:
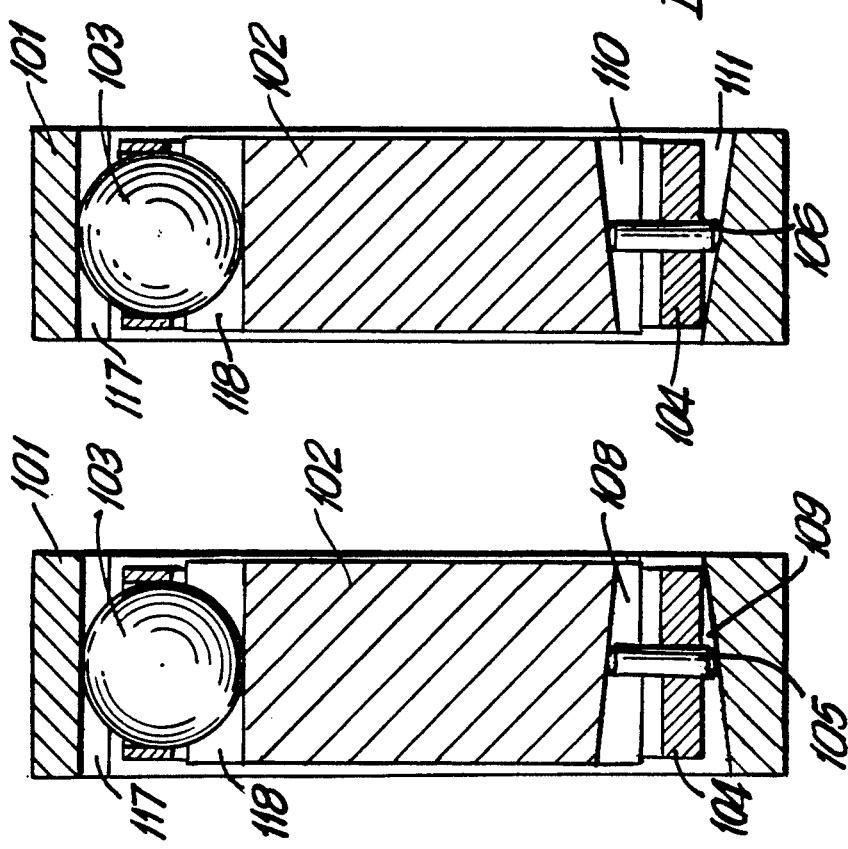

In FIG. 2 the control members 105, 106 and the torque-transmitting balls 103 are on the same pitch circle. In FIGS. 2a, 2b, 2c, in another embodiment of the arrangement in FIG. 2, four control members 105, 105, 106, 106 are shown on transmitting balls 103. Note the arrows indicating the inward displacement of the pitch circle for the control members relative to the pitch circle for the torque-transmitting balls.

Figure 3:
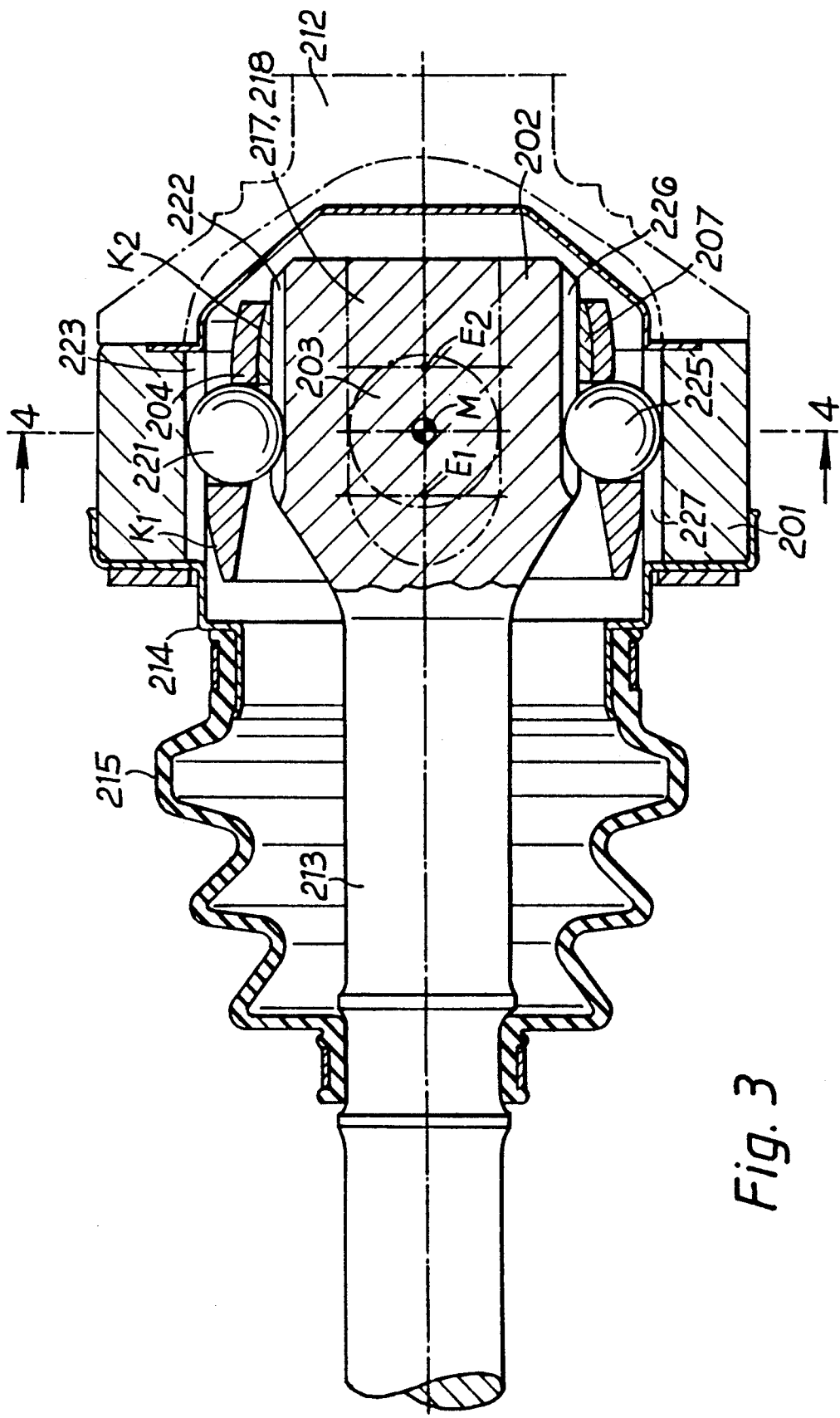
FIG. 3 is a longitudinal section through a further embodiment of joint according to the invention, on the line 3—3 of FIG. 4.
Figure 4:
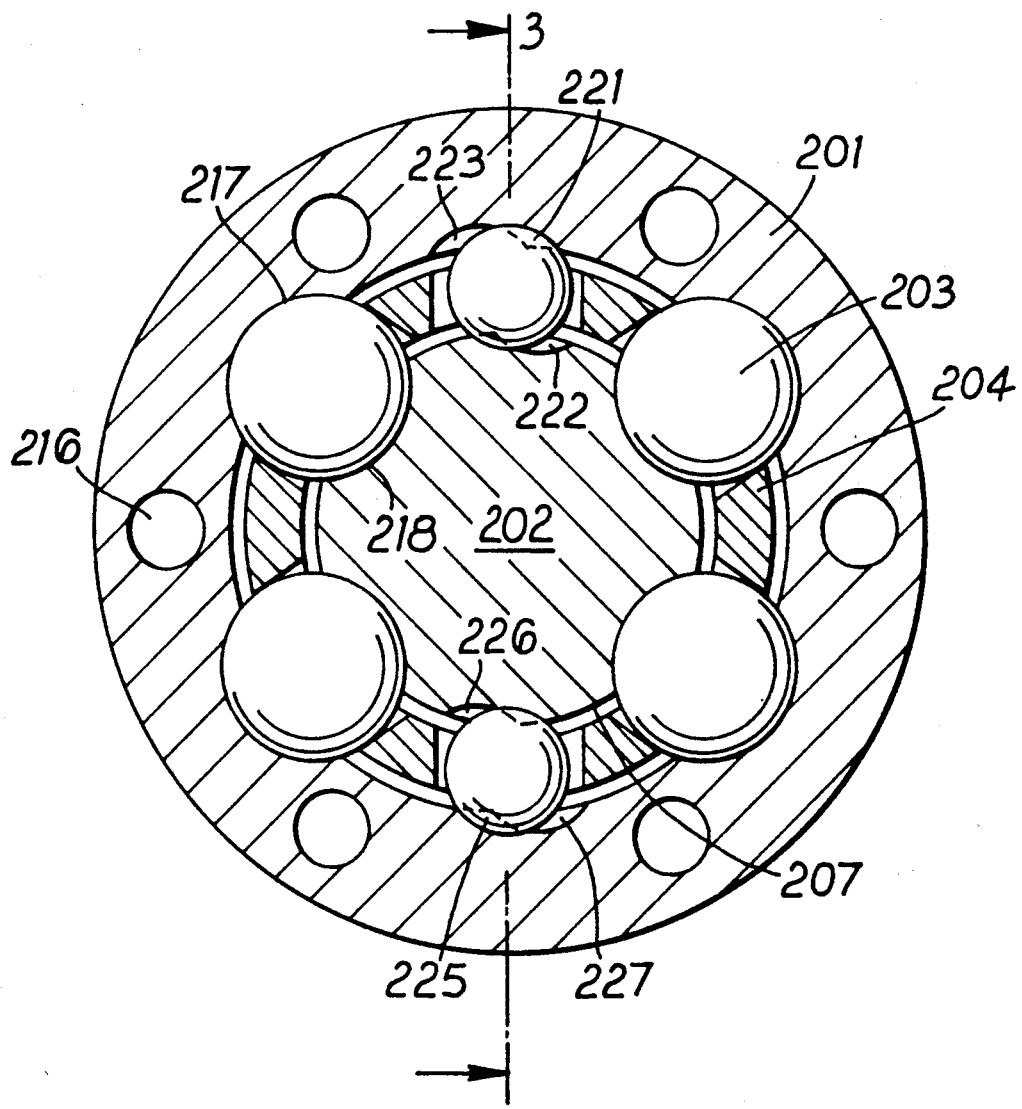
FIG. 4 is a transverse section through the joint of FIG. 3, on the line 4—4 thereof.

Referring now to FIGS. 3 and 4 of the drawings, these show a joint of which the main parts for torque transmission correspond to parts of the joint of FIGS. 1 and 2, and are therefore identified by corresponding reference numerals in the 200 series. Thus, the joint comprises an outer joint member 201, an inner joint member 202, bell 212, cap 214, and sealing boot 215 connected between the cap 214 and shaft portion 213 extending from the inner joint member 202. A plurality, in this case four, of torque-transmitting balls 203 are disposed between the outer and inner joint members, engaging axis-parallel tracks 217, 218 therein. There is also a cage 204 with internal and external surfaces K1, K2 of part-spherical configuration, and a sleeve 207.

In this embodiment of joint, the control members comprise balls 221, 225, disposed diametrically opposite one another in the joint and each engaging in a facing pair of further tracks 222, 223 and 226, 227 in the joint members. The further tracks 222, 226, 223, 227 have centre lines which do not lie in the planes containing the axes of rotation of the joint members, but are inclined relative thereto. The facing pair of further tracks 222, 223 are equally and oppositely inclined relative to the plane containing (in a non-articulated joint) the common axis of rotation of the joint members, so that as the further tracks are considered in a developed view of the joint, they cross one another. The projections of the centre lines on the common axis of rotation of the joint members in a non-articulated joint intersect such axis at equal and opposite angles. Similarly the further tracks 226, 227 are equally and oppositely inclined so as to cross one another, in the general manner of the tracks in which the torque-transmitting balls engage in a constant velocity ratio universal joint of the cross-groove type.

In developed view of the joint, the centre lines of the tracks 223 and 227 in the outer joint member are parallel to one another, whilst those of the further tracks 222, 226 in the inner joint member are also parallel to one another. It would, however, be possible to have the tracks in the inner joint member oppositely inclined to one another, and also the tracks in the outer joint member oppositely inclined to one another, although it is preferred that they should be parallel for manufacturing simplicity.

The crossing arrangement of the facing pairs of further tracks containing the control members in the form of balls 221, 225 has the effect of guiding the cage 204 to centre it axially relative to the joint members during plunge of the joint, in the same manner as above described. Although theoretically one control member 221 or 225 engaging a single crossing pair of further tracks would be able to carry out the desired control function, it is advantageous for balancing of the joint for there to be a diametrically opposed pair of such control members.

Referring now to FIGS. 5, 6 and 7 of the drawings, these show a further embodiment of joint wherein components corresponding to those previously described are identified by corresponding reference numerals in the 300 series. There is an outer joint member 301, an inner joint member 302, and torque-transmitting balls 303 of which there are four equally circumferentially spaced about the joint, engaging tracks 317, 318 in the joint members, which tracks are of uniform depth and parallel to the axes of the respective joint members. There is also a cage 304, but the cage does not have inner and outer part-spherical surfaces as in the embodiments above described.

Circumferentially spaced about the joint, between the torque-transmitting balls 303 and the tracks 317, 318 they engage, there are four control members 305, 306 which, in addition to controlling the axial position of the cage relative to the joint members, also guide the cage so that the torque-transmitting balls bisect the angle between the rotational axes of the joint members when the joint is articulated. The control members 305, 306 are in the form of cylindrical pins or pegs with hemispherical ends, as in the embodiment of FIGS. 1 and 2, and engage in facing pairs of further tracks 308, 309, 310, 311 in the joint members. The tracks 308 to 311 have planar bases and centre lines which lie in the planes containing the rotational axes of the respective joint members, but are not parallel to such axes so that they intersect as in the embodiment of FIGS. 1 and 2. The centre lines of two diametrically opposed facing pairs of further tracks 308, 309 intersect to one side of the joint, while the centre lines of the other diametrically opposed pairs of facing further tracks 310, 311 intersect the other side of the joint.

The configuration of the further tracks 308 to 311 and the control members 305, 306 engaging such further tracks is effective both to centre the cage relative to the two joint members and guide it to move axially relative to each joint member by half the total plunging distance of the joint, and also to guide the cage angularly so that the balls held thereby have their centres guided to the bisector plane. From consideration of an articulated joint, it will be appreciated that if two of the diametrically opposed control members are in a plane perpendicular to the plane containing the rotational axes of the two joint members, such control members will have no effect on the attitude of the cage between the joint members. Only the control members which are in such plane of articulation of the joint are effective to guide attitude of the cage. Therefore, in the joint embodiment where the control members also control the cage attitude as well as its axial position, it is necessary for there to be at least four control members and facing pairs of further tracks.

FIG. 7A shows part of the joint of FIG. 7 to illustrate a possible modification thereof. The further tracks in the joint members, one pair of which is shown at 308A, 309A, have base portions 308B, 309B curved transversely to the joint axis which comprise parts of cones due to the axially extending arrangement of the further joints as shown in FIGS. 5 and 6, instead of having planar bases as the further tracks previously described. The centre lines of further tracks with such bases intersect in the same manner as the centre lines of further tracks having planar bases as in FIG. 7.

In all embodiments of joint above described, the torque-transmitting balls may have some clearance in the apertures they occupy in the cage, in the direction circumferentially of the cage as a whole to give the balls some circumferential free play. The inclination of the tracks engaged by the control members must be selected so that the control members do not self-lock therein and cause the joint to become jammed.

I claim:

1. A constant velocity ratio plunging universal joint, comprising:
   an inner joint member having a rotational axis and an external cylindrical surface thereon;
   an outer joint member having a rotational axis and an internal cylindrical surface thereon;
   a number of tracks provided in each of said cylindrical surfaces and spaced circumferentially apart relative to said rotational axes and arranged in facing pairs, each of said tracks having a centre line parallel to the rotational axis of the corresponding joint member;

a plurality of balls, each disposed in one of said facing pairs of said tracks for torque transmission between said joint members;

a sleeve slidable on said external cylindrical surface of said inner joint member and having an external part-spherical surface;

a cage of annular form disposed between said joint members and provided with internal and external part-spherical surfaces and with apertures for receiving said balls so that all of the centres thereof lie in a common plane, said internal and external part-spherical surfaces of the cage having corresponding centres of curvature equally offset to opposite sides of said plane, said internal part-spherical surface of said cage engaging the external part-spherical surface of said sleeve and said external part-spherical surface of said cage engaging said internal cylindrical surface of said outer joint member;

at least one facing pair of further tracks each located in a different one of said joint members, a control member engaged in said pair of further tracks and engaging said cage;

each track of said further pair having a centre line inclined to the rotational axis of the corresponding said joint member, the inclinations to the corresponding rotational axes of the corresponding tracks of said further pair being equal and opposite when said rotational axes are aligned so that when said joint plunges, said cage is moved by the control member relative to each said joint member by an axial distance equal to half of the total plunging movement of said joint.

2. A joint according to claim 1 wherein there are provided at least two facing pairs of said further tracks in the joint members and control members engaged therein, the centre line of each further track lying in a plane which contains the axis of rotation of its joint member but the centre line being inclined to said axis so that the centre lines of the tracks of each facing pair thereof intersect one another, the centre lines of circumferentially adjacent facing pairs of further tracks intersecting one another on opposite axial sides of the joint.

3. A joint according to claim 2 wherein each of said further tracks has a base portion which is part of a conical surface.

4. A joint according to claim 2 wherein the control members comprise cylindrical members disposed in radial orientation in the joint, having hemispherical ends engaging the further tracks.

5. A joint according to claim 2 wherein the control members comprise balls smaller than the torque-transmitting balls.

6. A joint according to claim 1 wherein the centre lines of the further tracks in each pair thereof are inclined to planes containing the rotational axes of the joint members, and projections of said centre lines on the common axis of rotation of the joint members in an aligned joint intersect such axis at equal and opposite angles.

7. A joint according to claim 6 wherein there is provided a plurality of said facing pairs of further tracks, and the centre lines of the further tracks in each joint member, in developed view of the joint member, extend parallel to one another.

8. A joint according to claim 1 wherein the control members have centres which are disposed on a pitch circle of different diameter from the pitch circle of the centres of the torque-transmitting balls.

9. A joint according to claim 1 wherein the control members occupy apertures provided in the cage, and are substantially clearance-free therein.

10. A joint according to claim 1 wherein the torque-transmitting balls are received in apertures in the cage with some freedom of movement circumferentially of the cage.

11. A joint according to claim 1 wherein said torque-transmitting balls are disposed in pairs, the balls in each pair being diametrically opposite one another in the joint.

12. A constant velocity ratio plunging universal joint comprising an inner joint member having a rotational axis;

an outer joint member having a rotational axis;

a number of tracks provided in each of said joint members and spaced circumferentially apart about said rotational axes in facing pairs, each of said tracks having a centre line parallel to the rotational axis of the corresponding joint member; a plurality of balls disposed in each said facing pair of said tracks for torque transmission between said joint members;

a cage of annular form disposed between said joint members and provided with apertures for holding said balls so that the centres of said balls lie in a common plane;

at least four facing pairs of further tracks in said joint member and positioned between said tracks;

at least four control members each located in one of said pairs of further tracks, each control member comprising a cylindrical pin carried by said cage and extending radially of said rotational axes and said pins having hemispherical ends engaged in said tracks of each of said pair of further tracks;

each track of each of said further pair having a centre line disposed in a plane containing the rotational axis of said joint member wherein said track is located, but said track being inclined to said axis, the inclinations to the corresponding rotational axis of said tracks of each of said further pairs being equal and opposite when said rotational axes are aligned and the intersection of one said pair of tracks is on one axial side of said joint while the intersection of an adjacent pair of said tracks is on the opposite axial side of said joint so that when the joint plunges, the cage is moved by the control members relative to each said joint member by an axial distance equal to half the total plunging movement of said joint, and so that said plane of said ball centres always bisects between the rotational axes of said joint members when said joint members articulate relative to on another.

13. A joint according to claim 1 or 12 wherein there are a greater number of said torque-transmitting balls than there are of said control members.

14. A joint according to claim 12 wherein each of said further tracks has a base portion which is part of a conical surface.

15. A joint according to claim 12 wherein there are provided four each of said torque-transmitting balls and said control members, disposed alternately circumferentially of the joint.

* * * * *